(12) United States Patent
Brenner et al.

(10) Patent No.: US 11,197,563 B1
(45) Date of Patent: Dec. 14, 2021

(54) ADAPTABLE PRODUCT DISPLAY SYSTEMS AND METHODS

(71) Applicant: iSee Store Innovations, L.L.C., St. Louis, MO (US)

(72) Inventors: Steven Allen Brenner, Richmond Heights, MO (US); Matthew McCoy, Kirkwood, MO (US)

(73) Assignee: iSee Store Innovations, L.L.C., St. Louis, MO (US)

( * ) Notice: Subject to any disclaimer, the term of this patent is extended or adjusted under 35 U.S.C. 154(b) by 0 days.

(21) Appl. No.: 16/897,344

(22) Filed: Jun. 10, 2020

(51) Int. Cl.
*A47F 5/10* (2006.01)
*G09F 7/02* (2006.01)
*F16M 11/42* (2006.01)
*A47F 5/00* (2006.01)
*G09F 23/06* (2006.01)

(52) U.S. Cl.
CPC ............ *A47F 5/108* (2013.01); *A47F 5/0018* (2013.01); *F16M 11/42* (2013.01); *G09F 7/02* (2013.01); *G09F 23/06* (2013.01)

(58) Field of Classification Search
CPC ........ A47F 5/108; A47F 5/0018; G09F 23/06; G09F 7/02; F16M 11/42; A47B 96/14; A47B 96/02; A47B 61/003; A47B 96/1441
See application file for complete search history.

(56) References Cited

U.S. PATENT DOCUMENTS

| | | | | |
|---|---|---|---|---|
| 2,919,034 A * | 12/1959 | Levy | ....................... | A47F 5/103 108/1 |
| 5,607,070 A * | 3/1997 | Hellyer | .................... | A47F 5/108 211/189 |
| 5,918,750 A * | 7/1999 | Jackson | .................. | A47F 5/137 108/108 |
| 5,921,414 A * | 7/1999 | Burke | ..................... | A47B 57/42 211/187 |
| 6,152,312 A * | 11/2000 | Nava | ..................... | A47B 61/003 211/94.01 |
| 6,427,857 B1 * | 8/2002 | Adams | ....................... | A47F 5/10 211/162 |
| 6,783,012 B2 * | 8/2004 | Webb | ......................... | A47F 1/12 108/107 |
| 7,708,156 B2 * | 5/2010 | Johnson | ............... | A47B 57/487 211/106 |
| 7,815,202 B2 * | 10/2010 | Richards | ................. | A47F 5/135 280/79.7 |
| 8,448,959 B1 * | 5/2013 | Pohot | ....................... | B25H 3/02 280/47.131 |
| 9,743,543 B2 * | 8/2017 | Anderson | ............ | H05K 7/1488 |
| 9,936,825 B1 * | 4/2018 | Lindblom | .............. | A47F 5/0087 |
| 10,123,634 B2 * | 11/2018 | Volz | .......................... | A47F 5/10 |
| 10,568,423 B1 * | 2/2020 | McDowell | ............. | A47B 46/00 |
| 2008/0142463 A1 * | 6/2008 | Johnson | ............... | A47B 57/487 211/187 |

(Continued)

*Primary Examiner* — Ko H Chan
(74) *Attorney, Agent, or Firm* — The Small Patent Law Group LLC; Joseph M. Butscher

(57) ABSTRACT

A product display system includes a base, a shelving support assembly coupled to the base, and one or more shelves removably secured to the shelving support assembly. The one or more shelves are securable to the shelving support assembly in a first configuration and a second configuration that differs from the first configuration.

20 Claims, 9 Drawing Sheets

(56) References Cited

U.S. PATENT DOCUMENTS

| | | | |
|---|---|---|---|
| 2009/0165771 A1* | 7/2009 | Selk | A47J 37/0781 |
| | | | 126/25 R |
| 2013/0168335 A1* | 7/2013 | Gillespie | F16M 11/22 |
| | | | 211/26 |
| 2014/0263128 A1* | 9/2014 | Garrett | A47F 5/0815 |
| | | | 211/144 |
| 2015/0313357 A1* | 11/2015 | David | A47B 57/20 |
| | | | 211/187 |

* cited by examiner

ADAPTABLE PRODUCT DISPLAY SYSTEMS AND METHODS

FIELD OF EMBODIMENTS OF THE DISCLOSURE

Embodiments of the present disclosure generally relate to product display systems, which are configured for displaying products in a plurality of different configurations.

BACKGROUND OF THE DISCLOSURE

Various commercial enterprises offer goods for sale. Goods are typically positioned on shelves or stands within a store. For example, a convenience store includes shelves for products. The shelves may be on either side of an aisle within the convenience store.

Typically, the shelves are fixed in position. Accordingly, certain goods may be too large or conversely too small to be effectively displayed for sale on certain types of shelves.

SUMMARY OF THE DISCLOSURE

A need exists for a product display that may be reconfigured to support and display items (such as goods for sale, promotional materials, etc.) as desired. Further, a need exists for a product display that may be easily moved to different locations within an establishment.

With those needs in mind, certain embodiments of the present disclosure provide a product display system including a base, a shelving support assembly coupled to the base, and one or more shelves removably secured to the shelving support assembly. The one or more shelves are securable to the shelving support assembly in a first configuration and a second configuration that differs from the first configuration. For example, the first configuration includes a horizontal orientation, and the second configuration includes a vertical orientation. In at least one embodiment, the one or more shelves include at least three shelves.

In at least one embodiment, one or more wheel assemblies are secured to a rear of the base. The product display system is configured to be tilted rearwardly so that the one or more wheel assemblies abut against a floor. For example, the one or more wheel assemblies include a first wheel assembly located at a first lateral rear end of the base, and a second wheel assembly located at a second lateral rear end of the base opposite from the first lateral rear end. In at least one embodiment, when the product display system is supported on the floor such that lower edges of the base abut against the floor, the wheel assemblies are spaced apart from the floor.

In at least one embodiment, a brace is configured to be moved between a retracted position and a deployed position. The brace in the deployed position reduces a potential of the product display system rearwardly tipping.

In at least one embodiment, a header is coupled to the shelving support assembly. One one or both of the header or the shelving support assembly is configured to include features related to one or more products.

In at least one embodiment, the base includes an upper support wall that is configured to support an item for display. For example, the upper support wall is parallel with a support ledge of the one or more shelves in the first configuration.

In at least one embodiment, the shelving support assembly includes lateral upright beams extending upwardly from a rear end of the base, a rear wall extending between the lateral upright beam, and a top beam extending between the lateral upright beams over a top edge of the rear wall.

In at least one embodiment, the one or more shelves include lateral arms, a front lip connected to the lateral arms, and a support ledge extending between the front lip and the lateral arms. The support ledge is configured to support an item in the first configuration. One or more hangers are removably coupled to the support ledge in the second configuration.

In at least one embodiment, the one or more shelves include one or more first coupling members configured to be retained within one or more openings of the shelving support assembly. The one or more first coupling members retained within the one or more openings support the one or more shelves in one of the first configuration or the second configuration. One or more second coupling members are configured to be retained within the one or more openings of the shelving support assembly. The one or more second coupling members retained within the one or more openings support the one or more shelves in the other of the first configuration or the second configuration.

In at least one embodiment, one or more clips are configured to secure the product display system to another product display system in a back-to-back fashion.

Certain embodiments of the present disclosure provide a product display method that includes removably securing one or more shelves to a shelving support assembly coupled to a base. Said removably securing includes securing the one or more shelves to the shelving support assembly in a first configuration, and securing the one or more shelves to the shelving support assembly in a second configuration that differs from the first configuration.

DETAILED DESCRIPTION OF THE DISCLOSURE

The foregoing summary, as well as the following detailed description of certain embodiments will be better understood when read in conjunction with the appended drawings. As used herein, an element or step recited in the singular and proceeded with the word "a" or "an" should be understood as not excluding plural of the elements or steps, unless such exclusion is explicitly stated. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide a product display system that includes a base, a shelving support assembly coupled to the base, and one or more shelves removably secured to the shelving support assembly. The one or more shelves are securable to the shelving support assembly in a first configuration and a second configuration that differs from the first configuration. For example, the first configuration includes a horizontal orientation, and the second configuration includes a vertical orientation. The one or more shelves may include at least three shelves.

In at least one embodiment, the product display system also includes one or more wheel assemblies secured to a rear of the base. The product display system is configured to be tilted rearwardly so that the one or more wheel assemblies abut against a floor.

In at least one embodiment, the product display system also includes a brace that is configured to be moved between a retracted position and a deployed position. The brace in the deployed position reduces a potential of the product display system rearwardly tipping.

The product display system may also include a header coupled to the shelving support assembly. One or both of the header or the shelving support assembly may be configured to include features related to one or more products.

Figure 1:
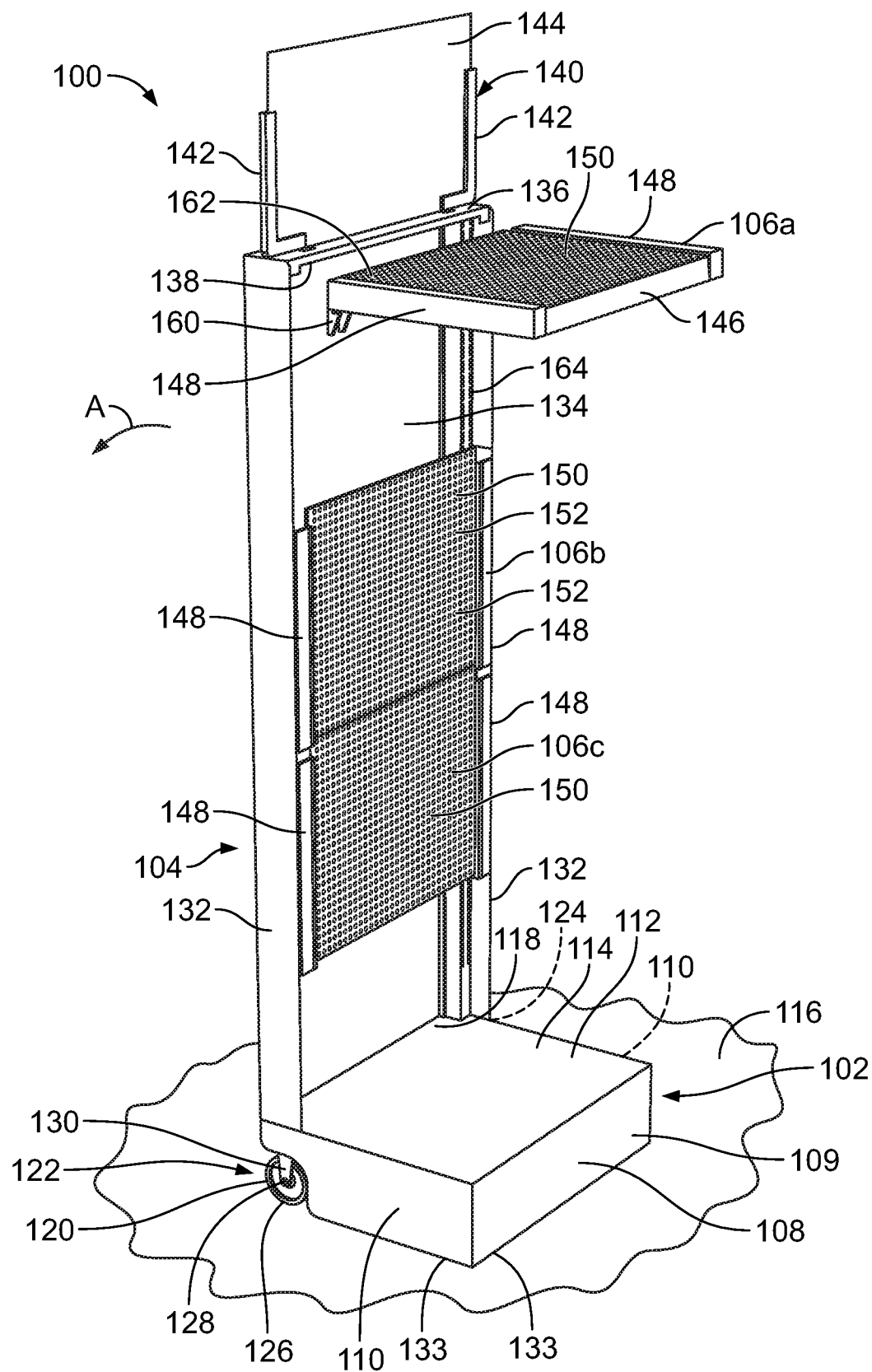
FIG. 1 illustrates a perspective front lateral view of a product display system, according to an embodiment of the present disclosure.

FIG. 1 illustrates a perspective front lateral view of a product display system 100, according to an embodiment of the present disclosure. The product display system 100 includes a base 102, a shelving support assembly 104 upwardly extending from the base 102, and a plurality of shelves 106 that are removably securable to the shelving support assembly 104.

The base 102 includes a cover 108 having a front wall 109 connected to lateral walls 110, and an upper support wall 112. The upper support wall 112 includes a flat surface 114 that may be orthogonal to the front wall 109 and the lateral walls 110. For example, when the product display system 100 is supported a floor 116, such as within a store, the flat surface 114 is disposed within a plane that is parallel to the floor 116. As an example, the flat surface 114 horizontally oriented, and the front wall 109 and the lateral walls 110 are vertically oriented. In at least one embodiment, the upper support wall 112 (such as the flat surface 114 thereof) is configured to support an item for display. The upper support wall 112 is parallel with at least a portion of the shelves 106, such as support ledges 150 of the shelves 106, when the shelves 106 are horizontally oriented (such as in a first configuration).

In at least one embodiment, the shelving support assembly 104 upwardly extends from a rear, such as a rear end 118, of the base 102. Wheel assemblies 120 may downwardly extend from the rear, such as the rear end 118, opposite from the shelving support assembly 104. For example, a first wheel assembly 120 is located at a first lateral rear end 122 and a second wheel assembly 120 is located at a second lateral rear end 124 opposite from the first lateral rear end 122.

Each wheel assembly 120 includes a wheel 126 that is rotatably coupled to an axle 128 extending between prongs 130 downwardly extending from the rear end 118 of the base 102. When the product display system 100 is supported on the floor 116 such that lower edges 133 of the base 102 (such as the lower edges 133 of the front wall 109 and the lateral walls 110) abut against the floor 116, the wheel assemblies 120 including wheels 126 may be spaced apart from the floor 116. In this manner, the product display system 100 may not inadvertently roll. Optionally, the wheels 126 may rest on the floor 116 when the lower edges 133 abut against the floor 116.

In order to quickly and easily move the product display system 100, an individual may grasp the shelving support assembly 104 and tip the product display system 100 rearwardly in the direction of arc A, so that the wheels 126 contact the floor 116, and the lower edges 133 are lifted off the floor 116. The individual may then roll the product display system 100 to a desired position via the wheel assemblies 120. Accordingly, in at least one embodiment, the product display system 100 includes one or more wheel assemblies 120 secured to the rear of the base 102. The product display system 100 is configured to be tilted rearwardly in the direction of arc A so that the wheel assembl(ies) 120 abut against the floor 116. Alternatively, the product display system 100 may not include the wheel assemblies 120.

The shelving support assembly 104 includes lateral upright beams 132 extending upwardly from the rear end 118 of the base 102. A rear wall 134 extends between the lateral upright beams 132. A top beam 136 extends between the lateral upright beams 132 over a top edge 138 of the rear wall 134. In at least one embodiment, the rear wall 134 may include graphics, text, or the like, such as may be used for advertisement, product promotion, or the like. For example, the rear wall 134 may include slots or the like that retain graphical displays (including graphics and text), such as removably sheets or inserts, that may be used for product advertisement and/or promotion.

A header 140 may upwardly extend from the top beam 136. The header 140 includes lateral brackets 142, such as L-shaped brackets, that retain a panel 144 therebetween. Like the rear wall 134, the panel 144 may include graphics, text, or the like, such as may be used for advertisement, product promotion, or the like. The panel 144 may be removably inserted between the lateral brackets 142, and may include graphical displays that may be used for product advertisement and/or promotion. Alternatively, the product display system 100 may not include the header 140.

As shown, the product display system 100 supports a plurality of shelves 106. For example, the product display system 100 includes three shelves 106 that are removably secured to the shelving support assembly 104. Optionally, the product display system 100 may be configured to support more than three shelves 106 or less than three shelves 106.

Each shelf 106 includes a front lip 146 connected to opposed lateral arms 148. The front lip 146 and the lateral arms 148 may have upright flat surfaces. A support ledge 150 extends between the front lip 146 and the lateral arms 148. The support ledge 150 is configured to support a product when the shelf 106 is supported between the lateral upright beams 132 of the shelving support assembly 104 in a first configuration in which the support ledge 150 is parallel to (or substantially parallel to, such as within 10 degrees of) the upper support wall 112 of the base 102 and/or the floor 116. As shown in FIG. 1, the shelf 106a is configured to be in the first configuration (although not connected to the shelving support assembly 104).

In at least one embodiment, the support ledge 150 includes a plurality of holes 152 formed therethrough. The holes 152 are configured to receive hooks, for example, which are then retained by the structure of the support ledge 150 surrounding the holes 152 when the shelf 106 is in a second configuration, in which the support ledge 150 is parallel to (or substantially parallel to, such as within 10 degrees of) the rear wall 134 of the shelving support assembly 104. As shown in FIG. 1, the shelf 106b is in the second configuration. The hooks or other such devices (such as pegs, loops, clasps, barbs, or the like) may be configured to allow products to hang therefrom.

Further, the shelves 106 may be stacked when in the second configuration (such as the vertical orientations). As shown in FIG. 1, the shelves 106b and 106c may be secured to the shelving support assembly 104 so that the shelf 106b is stacked over and on top of the shelf 106c.

Each shelf 106 is configured to be supported by the shelving support assembly 104 in the first configuration and the second configuration. That is, each shelf 106 is configured to be selectively and removably coupled to the shelving support assembly 104 in the first configuration and the second configuration. In at least one embodiment, each shelf 106 includes first coupling members 160 (such as flanged hooks, barbs, clasps, or the like) that downwardly extend from a rear end 162 of the shelf 106 (such as from the lateral arms 148) that are configured to couple to reciprocal openings 164 formed in interior surfaces of the lateral upright beams 132 of the shelving support assembly 104, thereby retaining the shelf 106 in the second configuration (for example, a vertical orientation). Additionally, each shelf includes second coupling members (hidden from view in FIG. 1) (such as flanged hooks, barbs, clasps, or the like) that rearwardly extend from the rear end 162 of the shelf 106 (such as from the lateral arms 148) that are configured to couple to the reciprocal openings 164, thereby retaining the shelf 106 in the first configuration (for example, a horizontal orientation).

In operation, the product display assembly 100 may be moved to different positions, as desired, via the wheel assemblies 120, as described above. The shelves 106 may be selectively moved between the first configuration and the second configuration, as desired, in order to support and display products of different shapes and sizes, as desired. Further, products may also be supported and displayed on the upper support wall 112 of the base 102. Additionally, the rear wall 134 and the panel 144 of the header 140 may include graphics, texts, or the like, such as on or within inserts coupled to the rear wall 134 and/or the panel 144, that provide advertisements and/or promotional material.

Figure 2:
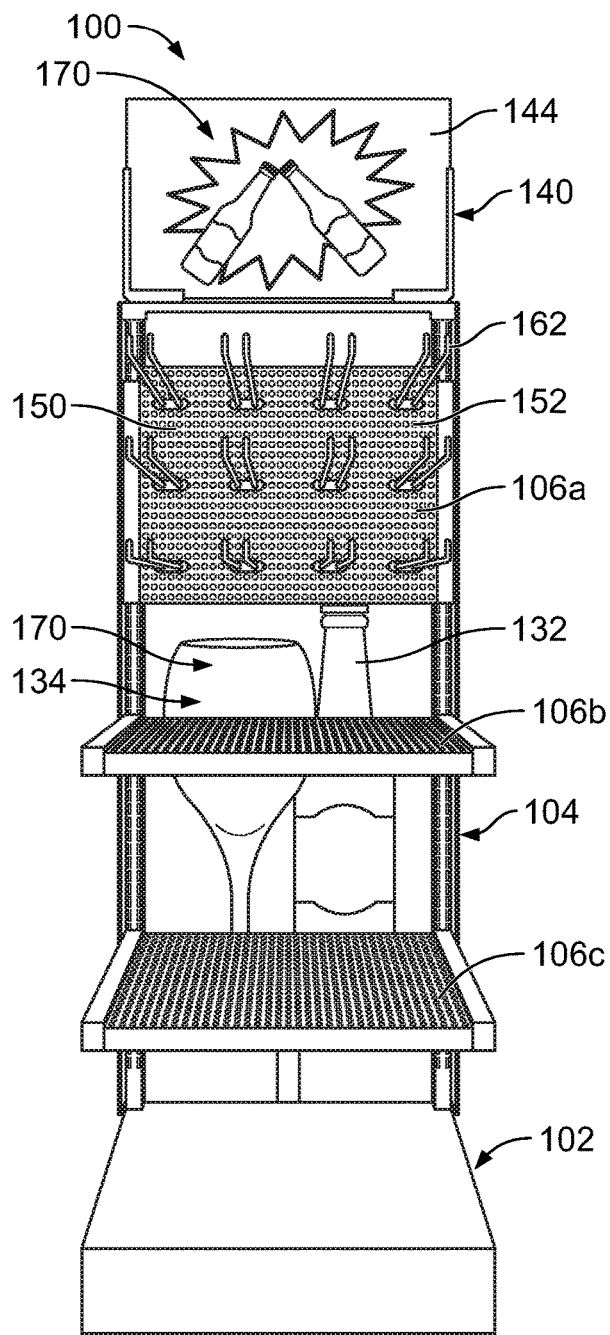
FIG. 2 illustrates a perspective front view of the product display system.

FIG. 2 illustrates a perspective front view of the product display system 100. As shown, the shelf 106a is in the second configuration, and the shelves 106b and 106c are in the first configuration. Hangers 162, such as peg hooks, are secured to support ledge 150 of the shelf 106a, such as via one or more holes 152 (for example, the hangers 162 includes portions, such as tabs, latches, hooks, or the like, which fit into the holes 152 and secure the hangers 162 to the support ledge 150). Products or the like may be hung from the hangers 162.

The rear wall 134 and the panel 144 may include features 170, such as graphics and/or texts. The features 170 may provide advertisements for a product and/or product promotional information. In at least one embodiment, the features 170 are integrally formed with the rear wall 134 and/or the panel 144. In at least one embodiment, the panel 144 may be removably secured to the header 140 so that a different panel 144 having different features 170 may be inserted into the header 140. Similarly, the rear wall 134 may be removably secured to the lateral upright beams 132 of the shelving support assembly 104 so that a different rear wall 134 having different features 170 may be inserted between the lateral upright beams 132. In at least one other embodiment, the panel 144 and the rear wall 134 may include retaining features, such as tabs, slots, and/or the like, that are configured to removably retain inserts, which may include the features 170.

Figure 3:
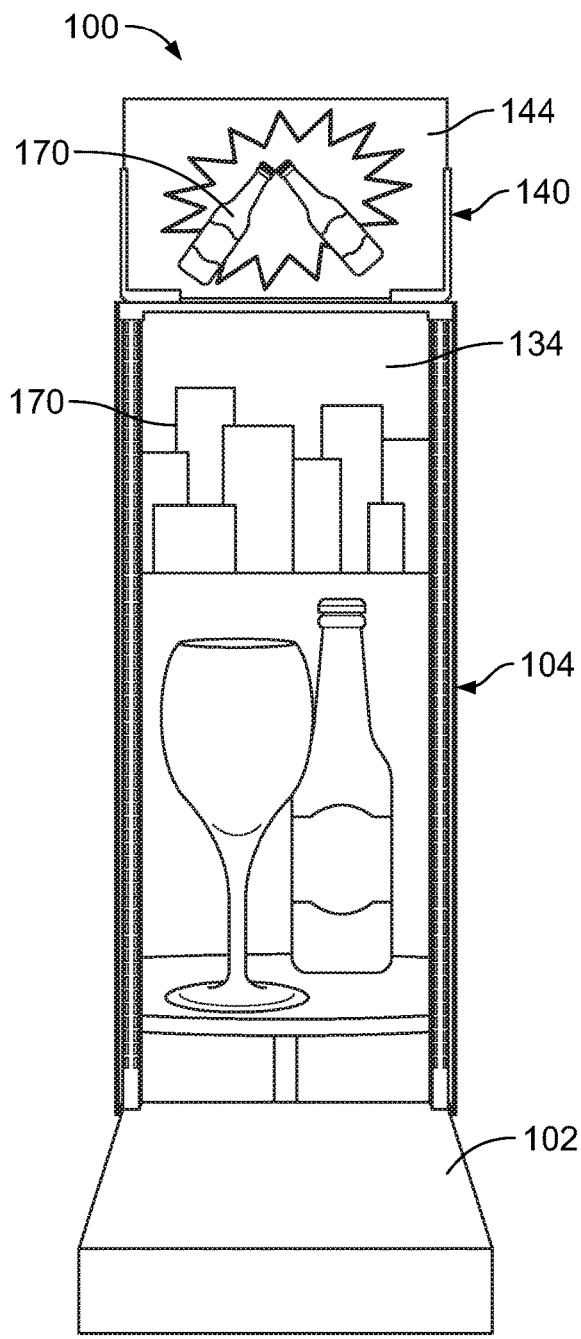
FIG. 3 illustrates a perspective front view of the product display system without shelves, according to an embodiment of the present disclosure.

FIG. 3 illustrates a perspective front view of the product display system 100 without shelves, according to an embodiment of the present disclosure. Referring to FIGS. 1-3, the shelves 106 may be removed and the features 170 shown on the rear wall 134 and the panel 144 of the header 140 may be prominently shown without interference from the shelves 106 and/or products. As such, the product display system 100 may be adapted, as desired, to provide signage, such as an advertisement, product promotion, informational notice, directional information, and/or the like.

Figure 4:
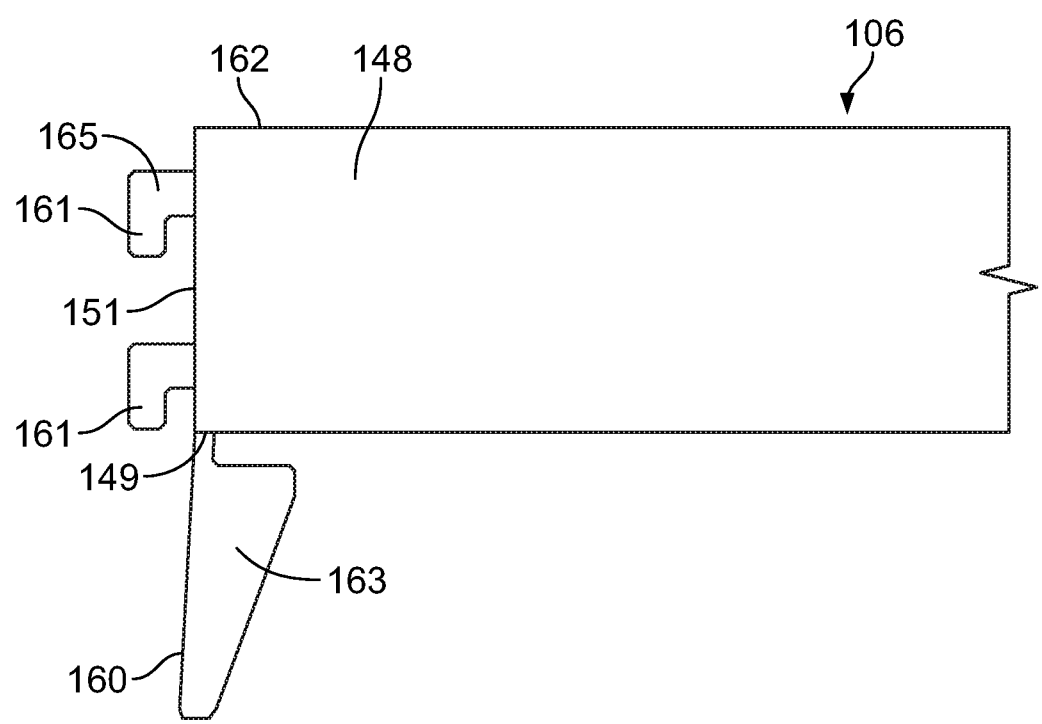
FIG. 4 illustrates a lateral view of a shelf, according to an embodiment of the present disclosure.
Figure 5:
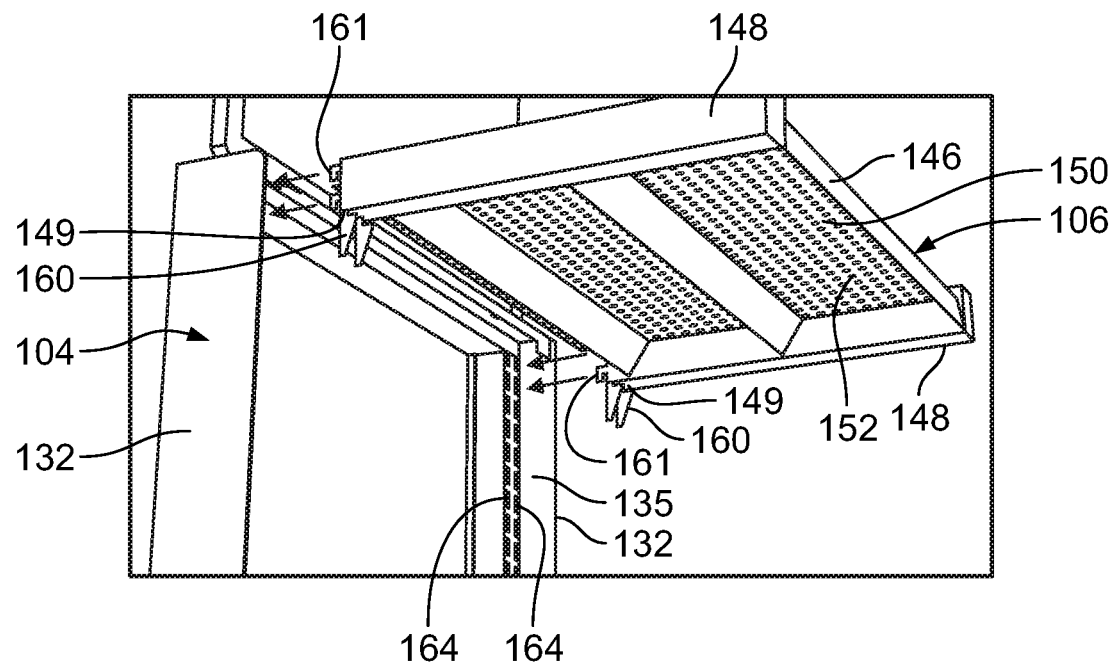
FIG. 5 illustrates a perspective bottom view of the shelf being oriented to secure to the shelving support assembly in a first configuration, according to an embodiment of the present disclosure.
Figure 6:
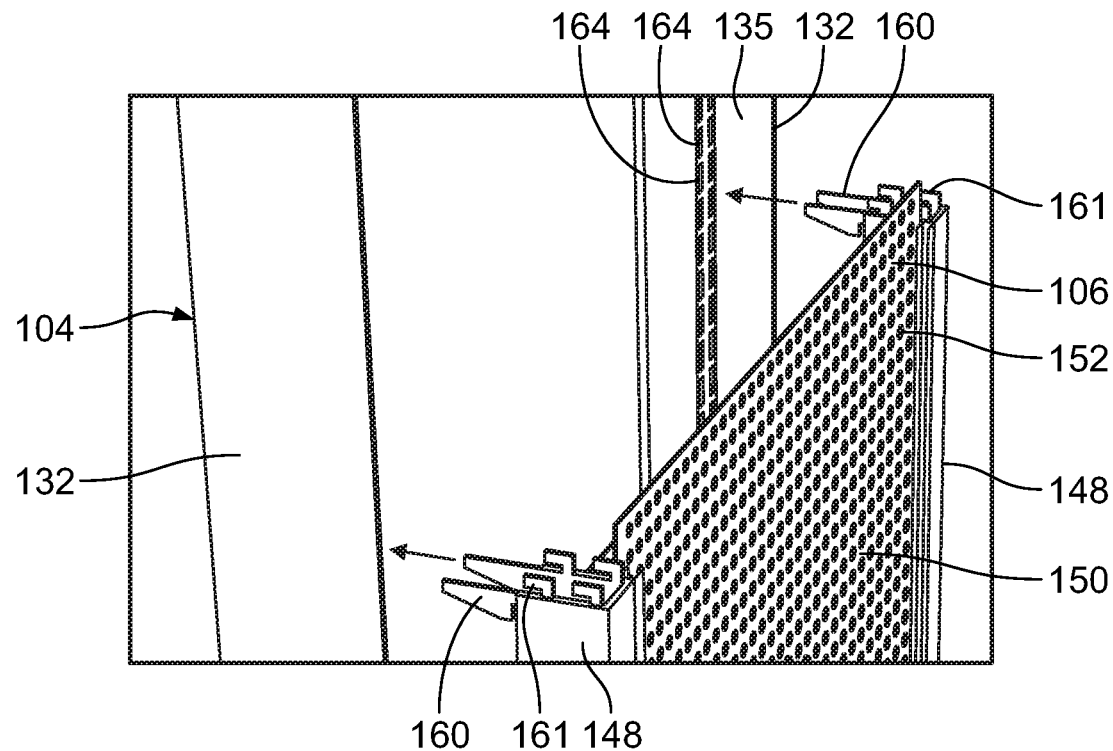
FIG. 6 illustrates a perspective top view of the shelf being oriented to secured to the shelving support assembly in a second configuration, according to an embodiment of the present disclosure.

FIG. 4 illustrates a lateral view of a shelf 106, according to an embodiment of the present disclosure. FIG. 5 illustrates a perspective bottom view of the shelf 106 being oriented to secure to the shelving support assembly 104 in the first configuration. FIG. 6 illustrates a perspective top view of the shelf 106 being oriented to secured to the shelving support assembly 104 in the second configuration.

Referring to FIGS. 4-6, the first coupling members 160 (such as flanged hooks, barbs, clasps, or the like) downwardly extend from the rear end 162 of the shelf 106 (such as from lower surfaces 149 of the lateral arms 148). The first coupling members 160 are configured to couple to the reciprocal openings 164 (shown in FIG. 1) formed in interior surfaces 135 of the lateral upright beams 132 of the shelving support assembly 104 to retain the shelf 106 in the second configuration (for example, a vertical orientation). Further the shelf 106 includes second coupling members 161 (such as flanged hooks, barbs, clasps, or the like) that rearwardly extend from the rear end 162 of the shelf 106 (such as from rear surfaces 151 of the lateral arms 148). The second coupling members 161 are configured to couple to the reciprocal openings 164 to retain the shelf 106 in the first configuration (for example, a horizontal orientation).

The first coupling members 160 and the second coupling members 161 may extend from each lateral arm 148. The shelf 106 may include more or less first coupling members 160 and/or second coupling members 161 than shown.

As shown, the first coupling arms 160 may include extension arms 163 that are longer than extension arms 165 of the second coupling arms 161. The increased length of the extension arms 163 is configured to provide added strength and robustness that prevents or otherwise reduces the potential of the shelf 106 bending or otherwise angling down in the first configuration (such as the horizontal orientation).

The first coupling members 160 are configured to be retained within the openings 164 of the shelving support assembly 104. The first coupling members 160 retained within the openings 164 support the shelves 106 in one of the first configuration or the second configuration. The second coupling members 161 are configured to be retained within the openings 164 of the shelving support assembly 104. The second coupling members 161 retained within the openings 164 support the shelves 106 in the other of the first configuration or the second configuration.

It is to be understood that the terms first, second, or the like are merely for labeling purposes. The first coupling members 160 may be considered second coupling members 161, or vice versa. Further, the first configuration may be considered the second configuration, or vice versa.

Figure 7:
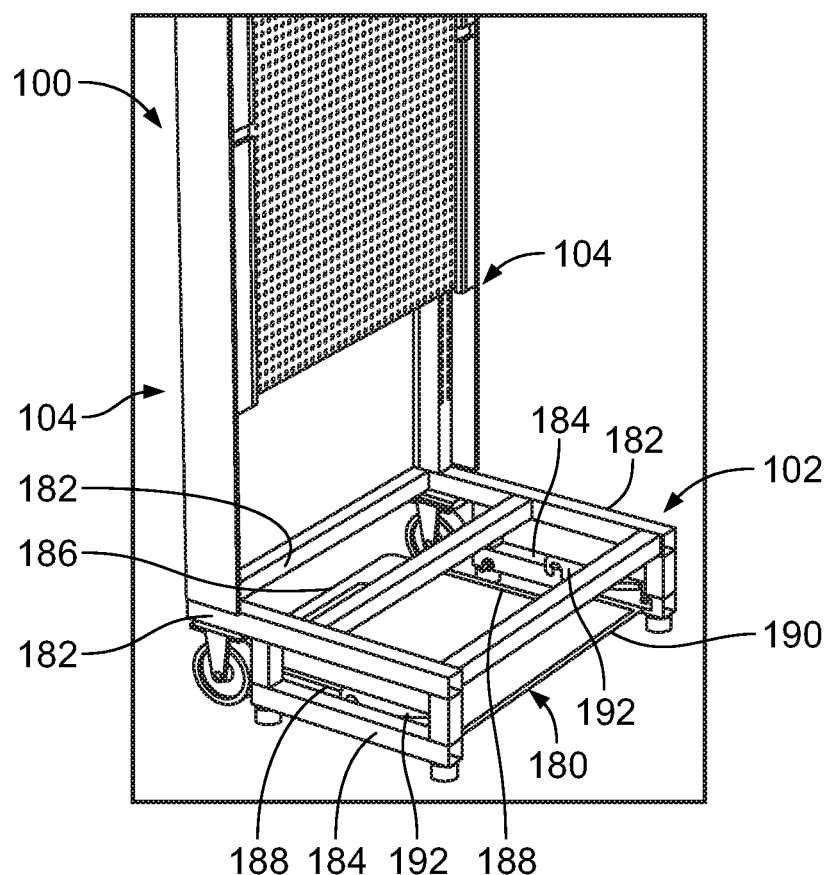
FIG. 7 illustrates a perspective top view of a brace within a base of the product display system, according to an embodiment of the present disclosure.

FIG. 7 illustrates a perspective top view of a brace 180 within the base 102 of the product display system 100, according to an embodiment of the present disclosure. For the sake of clarity, the cover 108 (shown in FIG. 1, for example) is not shown in FIG. 7. In at least one embodiment, the brace 180 may be formed include bent wire portions coupled to lateral flanges.

The base 102 may include a plurality of support beams 182 to which the wheel assemblies 120 and the shelving support assembly 104 are secured. Further, the brace 180 is moveably coupled to lower support beams 184.

Figure 8:
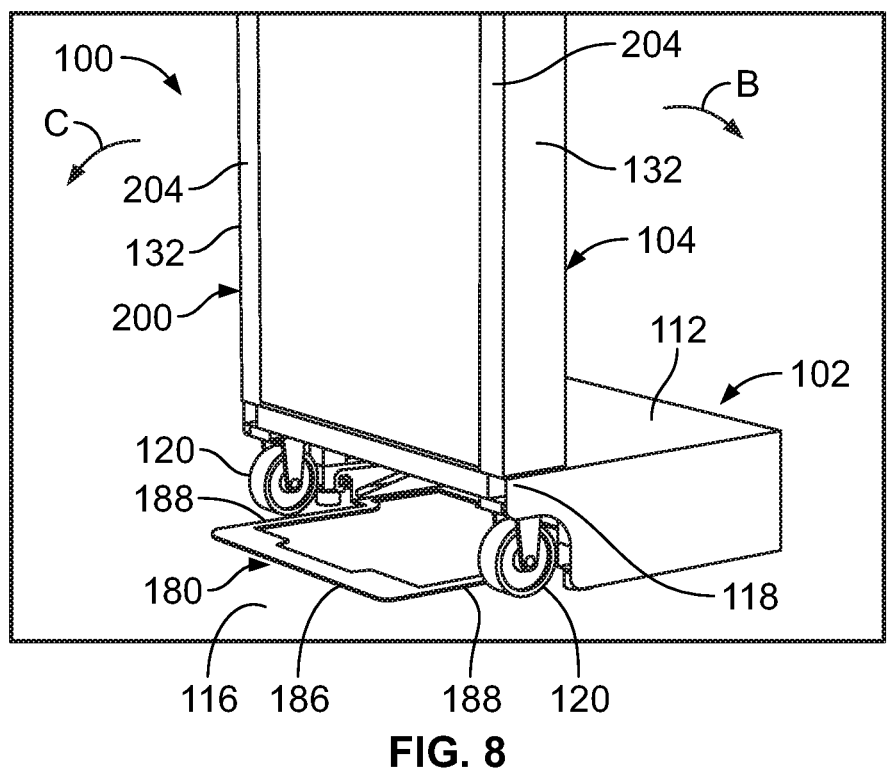
FIG. 8 illustrates a perspective rear view of the brace within the base of the product display system.

FIG. 8 illustrates a perspective rear view of the brace 180 within the base 102 of the product display system 100. Referring to FIGS. 7 and 8, in at least one embodiment, the brace 180 includes a rear flap 186 coupled to side arms 188, which are in turn connected to a front rod 190 (all of which may be formed of bent wire). Optionally, the brace 180 may be a contiguous flat panel. The side arms 188 and/or the front rod 190 are connected to coupling arms 192 (such as metal flanges), which moveably couple to the lower support beams 184, such as through a tab and slot relationship.

The brace 180 is configured to be moved between a retracted position (as shown in FIG. 7), and a deployed position (as shown in FIG. 8). The brace 180 is in the retracted position when the product display system 100 is moved to a different position. At a desired position, the brace 180 is moved into the deployed position to prevent the product displaying system 100 from rearwardly tipping. When the brace 180 is in the deployed position, the base 102 and the brace 180 cooperate to provide a secure and balanced bracing configuration that prevents or otherwise reduces tipping in the forward direction B and the rearward direction C.

In the deployed position, the brace 180 is flat against the floor 116, such that the rear flap 186 abuts against the floor 116 and extends rearwardly from the wheel assemblies 120. The brace 180 may be sized and shaped to fit underneath the upper support wall 112 of the base 102 when the brace 180 is in the retracted position. In the retracted position, the brace 180 may not contact the floor 116. Instead, the rear flap 186 may be tucked underneath the rear end 118 inward from the wheel assemblies 120 (or at least not extending rearwardly past the wheel assemblies 120).

Optionally, the brace 180 may be a flap panel that pivotally couples to the rear of the base 102 and/or the shelving support assembly 104. In this embodiment, the brace 180 may be upwardly oriented in a vertical orientation in the retracted position, and downwardly and outwardly pivoted into the deployed position, such that an edge abuts against the floor 116.

As another option, the brace 180 may be moveably coupled to the base 102 and/or the shelving support assembly 104 through latches. The latches may retain the brace 180 in the retracted position.

As another option, the brace 180 may be coupled to the base 102 and/or the shelving support assembly 104 through one or more springs. The springs may bias the brace 180 toward one of the retracted or deployed positions. Securing members, such as latches, may be used to secure the brace 180 in the retracted and/or deployed positions.

Alternatively, the product display system 100 may not include the brace 180.

Figure 9:
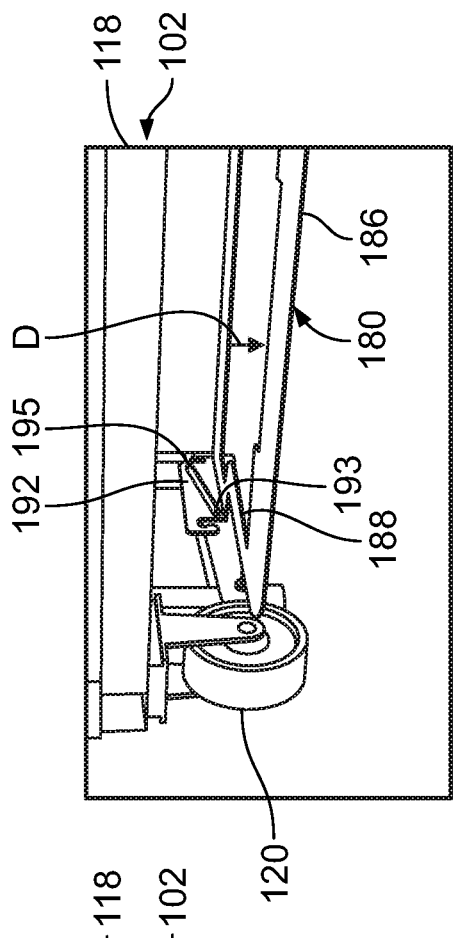
FIG. 9 illustrates a perspective rear view of the brace in a retracted position, according to an embodiment of the present disclosure.

FIG. 9 illustrates a perspective rear view of the brace 180 in a retracted position, according to an embodiment of the present disclosure. Referring to FIGS. 7 and 8, the coupling arms 192 are pivotally and slidably coupled to the lower support beams 184, such as through pivot axles 193 of the lower support beams 184 that are retained within slots 195 formed in the coupling arms 192. In the retracted position, the brace 180 is inwardly and upwardly disposed within the base 102, such that the brace 180 does not touch the floor 116.

Figure 10:
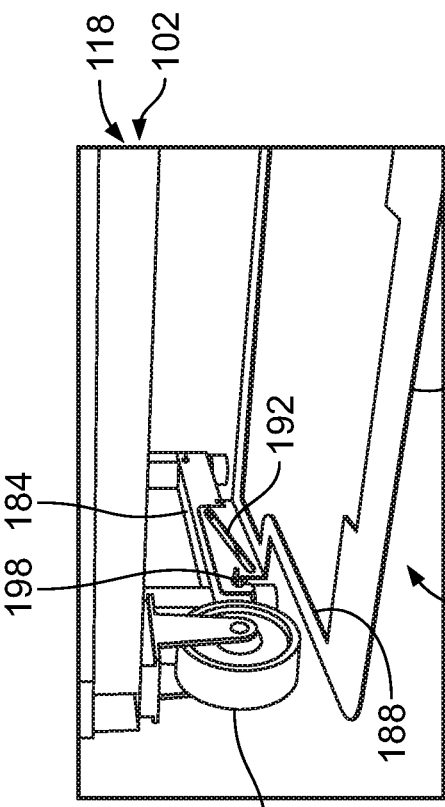
FIG. 10 illustrates a perspective rear view of the brace in an intermediate position, according to an embodiment of the present disclosure.

FIG. 10 illustrates a perspective rear view of the brace 180 in an intermediate position, according to an embodiment of the present disclosure. In order to deploy the brace 180, the brace 180 is grasped, such as via the rear flap 186, and pivoted downward in the direction of arrow D via the pivotal coupling between the coupling arms 192 and the lower support beams 184.

Figure 11:
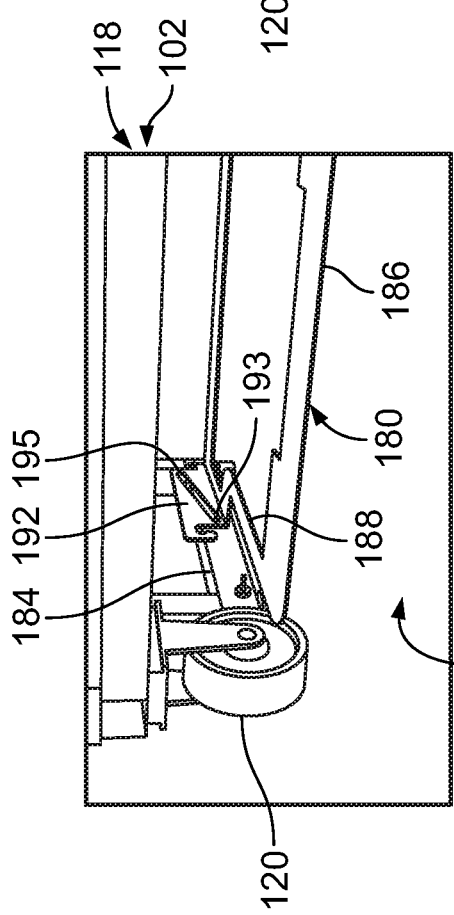
FIG. 11 illustrates a perspective rear view of the brace in a deployed position, according to an embodiment of the present disclosure.

FIG. 11 illustrates a perspective rear view of the brace 180 in the deployed position, according to an embodiment of the present disclosure. After the brace 180 is pivoted downwardly in the direction of arrow D, as shown in FIG. 10, the brace 180 is rearwardly slid in the direction of arrows E (such that coupling arms 192 slide over the pivot axles 193 of the lower support beams 184 via the slots 195) so that the rear flap 186 is rearwardly extended past the wheel assemblies 120 and abuts against the floor 116, thereby providing a bracing support that prevents or otherwise reduces a potential of rearward tipping.

In at least one embodiment, the brace 180 in the deployed position has the rear flap 186 and the side arms 188 flat against the floor 116. The brace 180 lying flat in the deployed position reduces a risk of an individual tripping over the brace 180.

Figure 12:
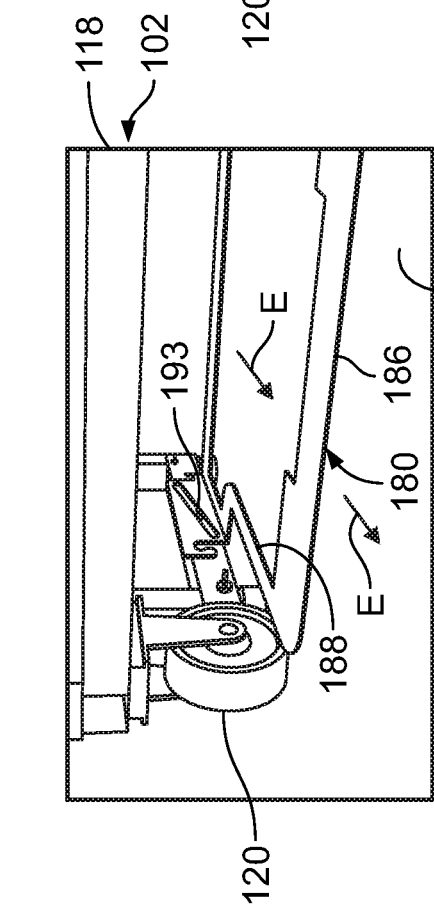
FIG. 12 illustrates a perspective rear of the brace in a locked and deployed position, according to an embodiment of the present disclosure.

FIG. 12 illustrates a perspective rear of the brace 180 in a locked and deployed position, according to an embodiment of the present disclosure. In at least one embodiment, the brace 180 may be locked in the deployed position, such as via notches 198 fitting over a feature, such as a portion of a fastener. Wingnuts may be used to securely lock the notches 198 in position.

Figure 13:
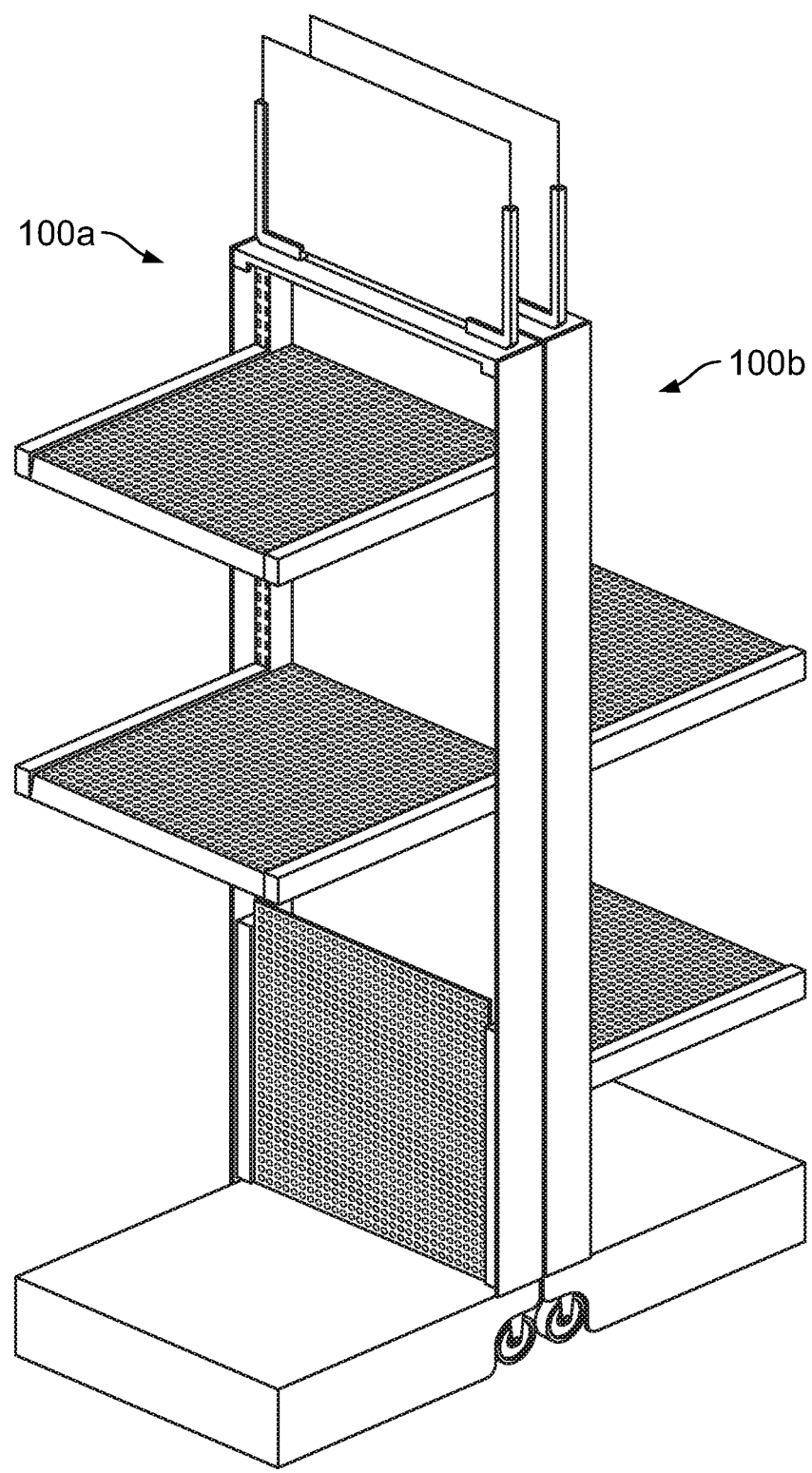
FIG. 13 illustrates a perspective lateral view of a first product display system coupled to a second product display system, according to an embodiment of the present disclosure.

FIG. 13 illustrates a perspective lateral view of a first product display system 100*a* coupled to a second product display system 100*b*, according to an embodiment of the present disclosure. The first product display system 100*a* and the second product display system 100*b* may be coupled together in a back-to-back fashion. As shown in FIG. 8, for example, rear surfaces 200 of the first product display system 100*a* and the second product display system 100*b* may be flat and flush. For example, the rear surfaces 200 may not include protuberances that rearwardly extend past flat rear surfaces 204 of the lateral upright beams 132. As such, the first product display 100a and the second product display system 100b may couple together, back-to-back, in a stable and flush manner.

Figure 14:
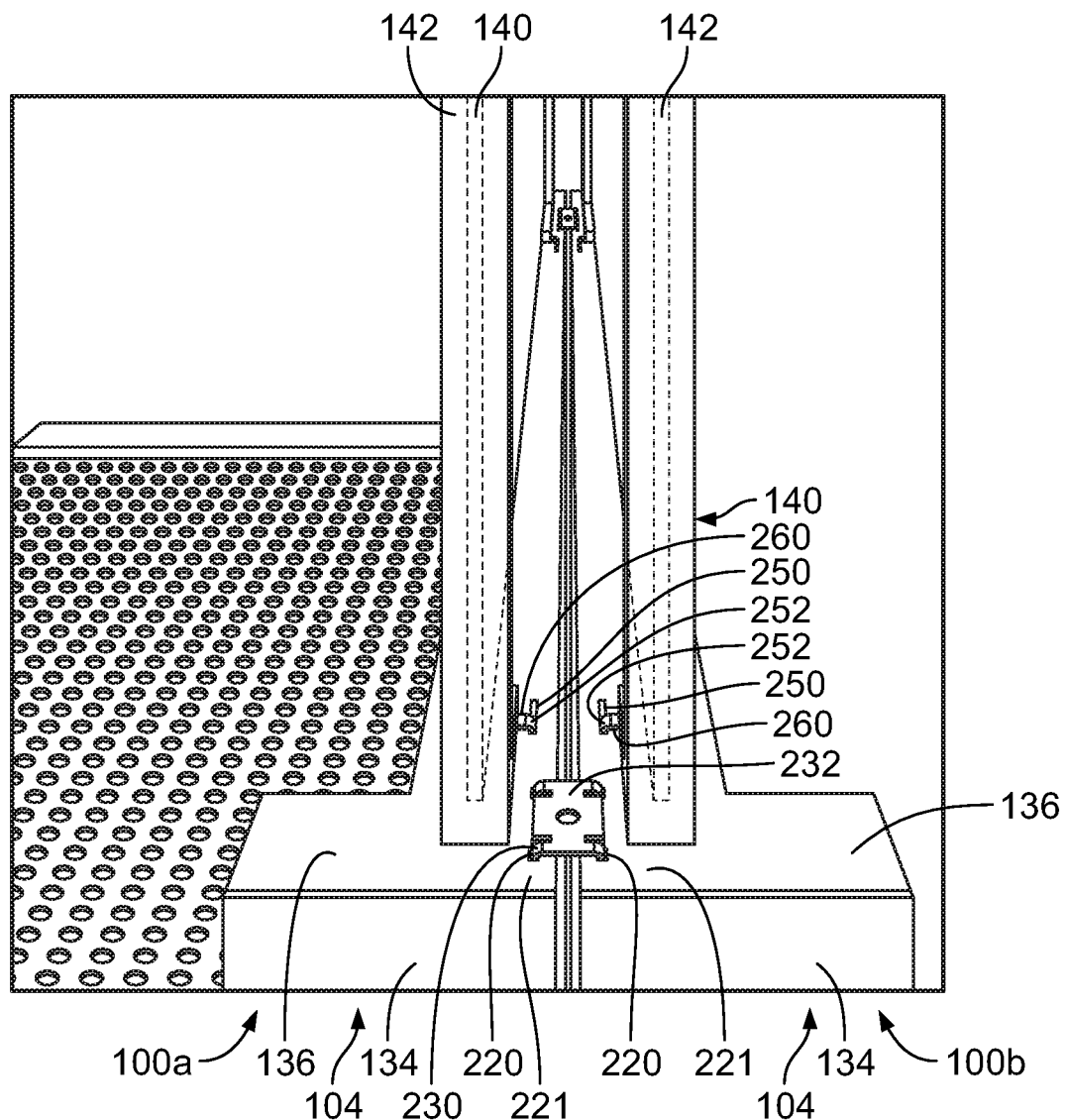
FIG. 14 illustrates a perspective top view of the first product display system coupled to the second product display system.

FIG. 14 illustrates a perspective top view of the first product display system 100a coupled to the second product display system 100b. Slots 220 may be formed in upper surfaces 221 of the shelving support assembly 104, such as within the top beam 136. The slots 220 are configured to receive and retain tabs 232 of the retaining clips 232. The retaining clips 232 may securely lock the first product display system 100a and the second product display system 100b together.

Additionally, the product display systems 100a and 100b may include header retaining slots 250, such as formed in the top beam 136. The header retaining slots 250 are configured to receive and retain tabs 252 of portions of the header 140 (such as of the lateral brackets 142), to secure the header 140 to the shelving support assembly 104. The tabs 252 may connect to stabilizing legs 260 that lie flat across the top beam 136 and securely stabilize the header 140 on the top beam 136. Alternatively, the product display systems 100a and 100b may not include the headers 140.

Referring to FIGS. 1-14, in at least one embodiment, the base 102 may include a retaining basket, pocket, drawer, or the like secured therein. The retaining basket may be used to retain various component, such as the retaining clips 232, hangers, inserts, and/or the like. Optionally, the product display system 100 may not include the retaining basket.

Figure 15:
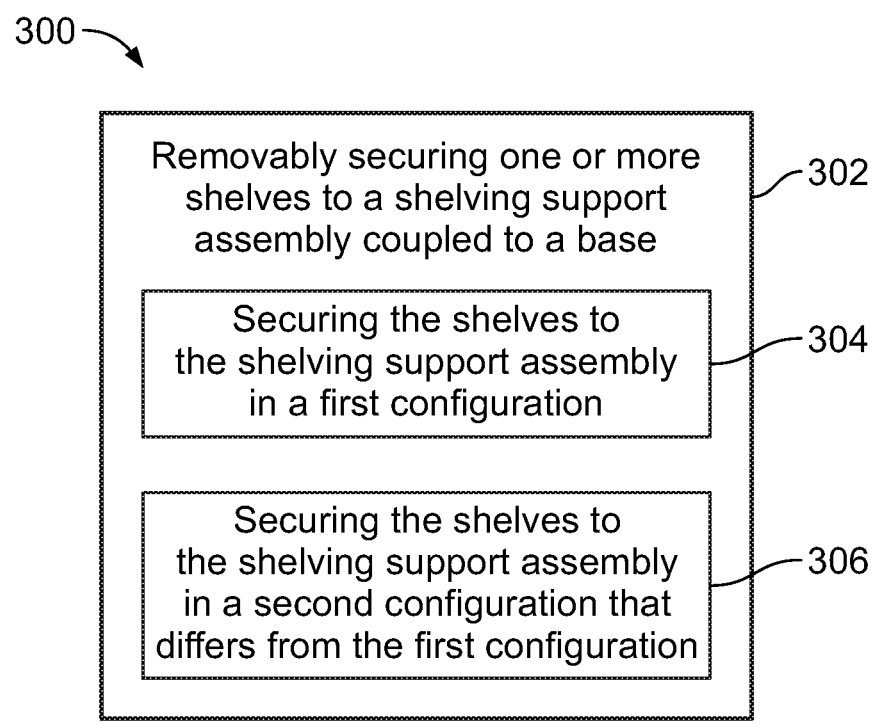
FIG. 15 illustrates a block diagram of a product display method, according to an embodiment of the present disclosure.

FIG. 15 illustrates a block diagram of a product display method 300, according to an embodiment of the present disclosure. Referring to FIGS. 1-15, the product display method 300 includes removably securing, at 302, one or more shelves 106 to the shelving support assembly 104 coupled to the base 102. Said removably securing 302 includes securing, at 304, the one or more shelves 106 to the shelving support assembly 104 in a first configuration, and securing, at 306, the one or more shelves 106 to the shelving support assembly 104 in a second configuration that differs from the first configuration. The first configuration may include a horizontal orientation, and the second configuration may include a vertical orientation.

In at least one example, the product display method also includes tilting the shelving support assembly 104 rearwardly so that one or more wheel assemblies 120 secured to a rear of the base 102 abut against a floor 116. In at least one embodiment, the product display method also includes supporting the base 102 on the floor 116 such that lower edges 133 of the base 102 abut against the floor 116 and the one or more wheel assemblies 120 are spaced apart from the floor 116.

In at least one example, the product display method includes moving a brace 180 between a retracted position and a deployed position. The brace 180 in the deployed position reduces a potential of the product display system 100 rearwardly tipping.

As described herein, embodiments of the present disclosure provide product display systems and methods that are reconfigurable to support and display items, as desired. Further, embodiments of the present disclosure provide product display systems and methods that may be easily moved to different locations within an establishment.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A product display system, comprising:
   a base;
   a shelving support assembly coupled to the base; and
   one or more shelves removably secured to the shelving support assembly, wherein the one or more shelves are securable to the shelving support assembly in a first configuration and a second configuration that differs from the first configuration, wherein the one or more shelves comprise:
   one or more first coupling members downwardly extending from a lower surface of the one or more shelves, the one or more first coupling members configured to be retained within one or more openings of the shelving support assembly, wherein the one or more first coupling members include one or more first extension arms having a first length, wherein the one or more first coupling members retained within the one or more openings support the one or more shelves in one of the first configuration or the second configuration, wherein the one or more first coupling members have a first shape; and one or more second coupling members rearwardly extending from an end of the one or more shelves, the one or more second coupling members configured to be retained within the one or more openings of the shelving support assembly, wherein the one or more second coupling members include one or more second extension arms having a second length, and wherein the first length is at least twice the second length, or vice versa, wherein the one or more second coupling members retained within the one or more openings support the one or more shelves in the other of the first configuration or the second configuration, wherein the one or more second coupling members have a second shape that differs from the first shape.

2. The product display system of claim 1, wherein the first configuration includes a horizontal orientation, and wherein the second configuration includes a vertical orientation.

3. The product display system of claim 1, wherein the one or more shelves comprise at least three shelves.

4. The product display system of claim 1, further comprising one or more wheel assemblies secured to a rear of the base, wherein the product display system is configured to be tilted rearwardly so that the one or more wheel assemblies abut against a floor.

5. The product display system of claim 4, wherein the one or more wheel assemblies comprise:
a first wheel assembly located at a first lateral rear end of the base; and
a second wheel assembly located at a second lateral rear end of the base opposite from the first lateral rear end.

6. The product display system of claim 4, wherein when the product display system is supported on the floor such that lower edges of the base abut against the floor, the one or more wheel assemblies are spaced apart from the floor.

7. The product display system of claim 1, further comprising a brace that is configured to be moved between a retracted position and a deployed position, wherein the brace in the deployed position reduces a potential of the product display system rearwardly tipping.

8. The product display system of claim 1, further comprising a header coupled to the shelving support assembly, wherein the header or the shelving support assembly is configured to include features related to one or more products.

9. The product display system of claim 1, wherein the base comprises an upper support wall that is configured to support an item for display.

10. The product display system of claim 9, wherein the upper support wall is parallel with a support ledge of the one or more shelves in the first configuration.

11. The product display system of claim 1, wherein the shelving support assembly comprises:
lateral upright beams extending upwardly from a rear end of the base;
a rear wall extending between the lateral upright beam; and
a top beam extending between the lateral upright beams over a top edge of the rear wall.

12. The product display system of claim 1, wherein the one or more shelves comprise:
lateral arms;
a front lip connected to the lateral arms; and
a support ledge extending between the front lip and the lateral arms,
wherein the support ledge is configured to support an item in the first configuration,
wherein the support ledge includes a plurality of holes formed therethrough, and
wherein one or more hangers are removably coupled to any of the plurality of holes of the support ledge in the second configuration.

13. The product display system of claim 1, further comprising one or more clips that are configured to secure the product display system to another product display system in a back-to-back fashion.

14. A product display method, comprising:
removably securing one or more shelves to a shelving support assembly coupled to a base, wherein the one or more shelves comprise:
one or more first coupling members downwardly extending from a lower surface of the one or more shelves, the one or more first coupling members configured to be retained within one or more openings of the shelving support assembly, wherein the one or more first coupling members include one or more first extension arms having a first length, wherein the one or more first coupling members retained within the one or more openings support the one or more shelves in one of a first configuration or a second configuration, wherein the one or more first coupling members have a first shape; and one or more second coupling members rearwardly extending from an end of the one or more shelves, the one or more second coupling members configured to be retained within the one or more openings of the shelving support assembly, wherein the one or more second coupling members include one or more second extension arms having a second length, and wherein the first length is at least twice the second length, or vice versa, wherein the one or more second coupling members retained within the one or more openings support the one or more shelves in the other of the first configuration or the second configuration, wherein the one or more second coupling members have a second shape that differs from the first shape,
wherein said removably securing comprises:
securing the one or more shelves to the shelving support assembly in the first configuration; and
securing the one or more shelves to the shelving support assembly in the second configuration that differs from the first configuration.

15. The product display method of claim 14, wherein the first configuration includes a horizontal orientation, and wherein the second configuration includes a vertical orientation.

16. The product display method of claim 14, further comprising tilting the shelving support assembly rearwardly so that one or more wheel assemblies secured to a rear of the base abut against a floor.

17. The product display method of claim 16, further comprising supporting the base on the floor such that lower edges of the base abut against the floor and the one or more wheel assemblies are spaced apart from the floor.

18. The product display method of claim 14, further comprising moving a brace between a retracted position and a deployed position, wherein the brace in the deployed position reduces a potential of a product display system rearwardly tipping.

19. A product display system, comprising:
a base including an upper support wall that is configured to support an item for display;
a shelving support assembly coupled to the base;
shelves removably secured to the shelving support assembly, wherein the shelves are securable to the shelving support assembly in a first configuration and a second configuration that differs from the first configuration, wherein the first configuration includes one of a horizontal orientation or a vertical orientation, wherein the second configuration includes the other of the horizontal orientation or the vertical orientation, and wherein the shelves comprise: (a) one or more first coupling members downwardly extending from a lower surface of the one or more shelves, the one or more first coupling members configured to be retained within one or more openings of the shelving support assembly, wherein the one or more first coupling members include one or more first extension arms having a first length, wherein the one or more first coupling members retained within the one or more openings support the one or more shelves in one of the first configuration or the second configuration, wherein the one or more first coupling members have a first shape; and (b) one or more second coupling members rearwardly extending from an end of the one or more shelves, the one or more second coupling members configured to be retained within the one or more openings of the shelving support assembly, wherein the one or more second coupling members include one or more second extension arms having a second length, and wherein the first length is at least twice the second length, or vice versa, wherein the one or more second coupling members retained within the one or more openings support the one or more shelves in the other of the first configuration or the second configuration, wherein the one or more second coupling members have a second shape that differs from the first shape;
one or more wheel assemblies secured to a rear of the base, wherein the product display system is configured to be tilted rearwardly so that the one or more wheel assemblies abut against a floor, wherein when the product display system is supported on the floor such that lower edges of the base abut against the floor, the one or more wheel assemblies are spaced apart from the floor;
a brace configured to be moved between a retracted position and a deployed position, wherein the brace in the deployed position reduces a potential of the product display system rearwardly tipping; and
a header coupled to the shelving support assembly, wherein one or both of the header or the shelving support assembly is configured to include features related to one or more products.

20. The product display system of claim 1, wherein the one or more openings comprise a plurality of openings, wherein each of the plurality of openings has a common size and shape.

* * * * *